Figure 1:
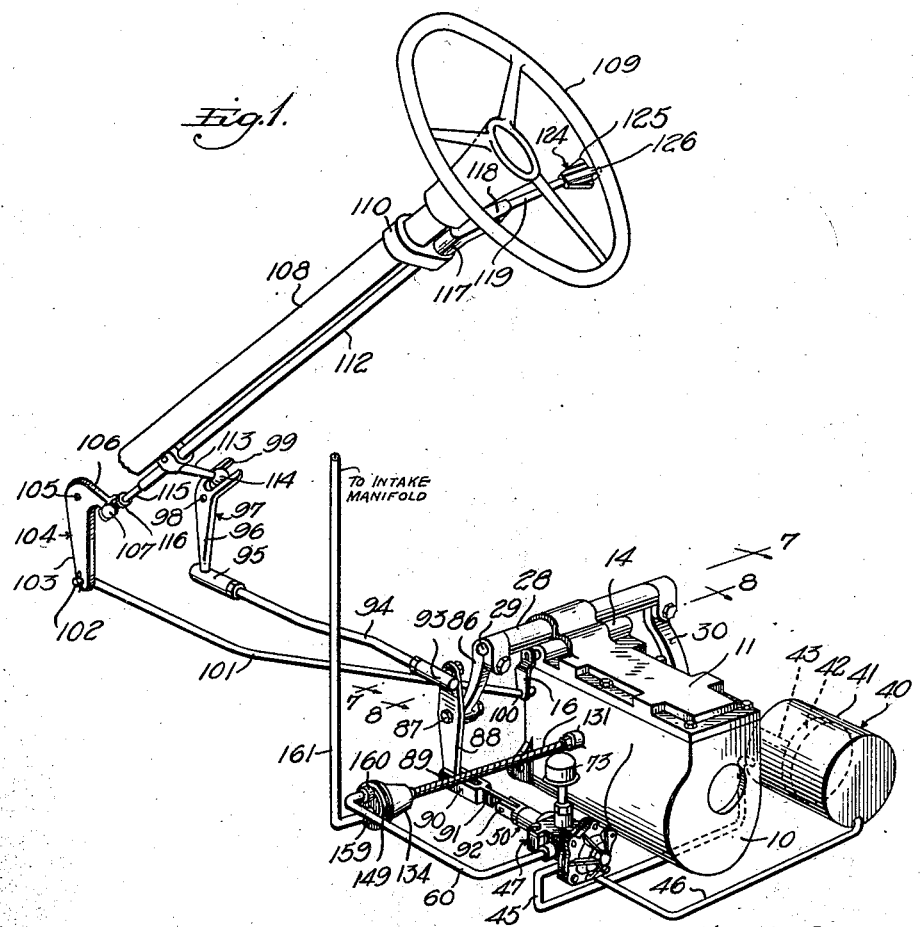

Feb. 4, 1941. H. W. HEY 2,230,777
GEAR SHIFTING MECHANISM
Filed March 15, 1938 4 Sheets-Sheet 1

Inventor
HENRY W. HEY

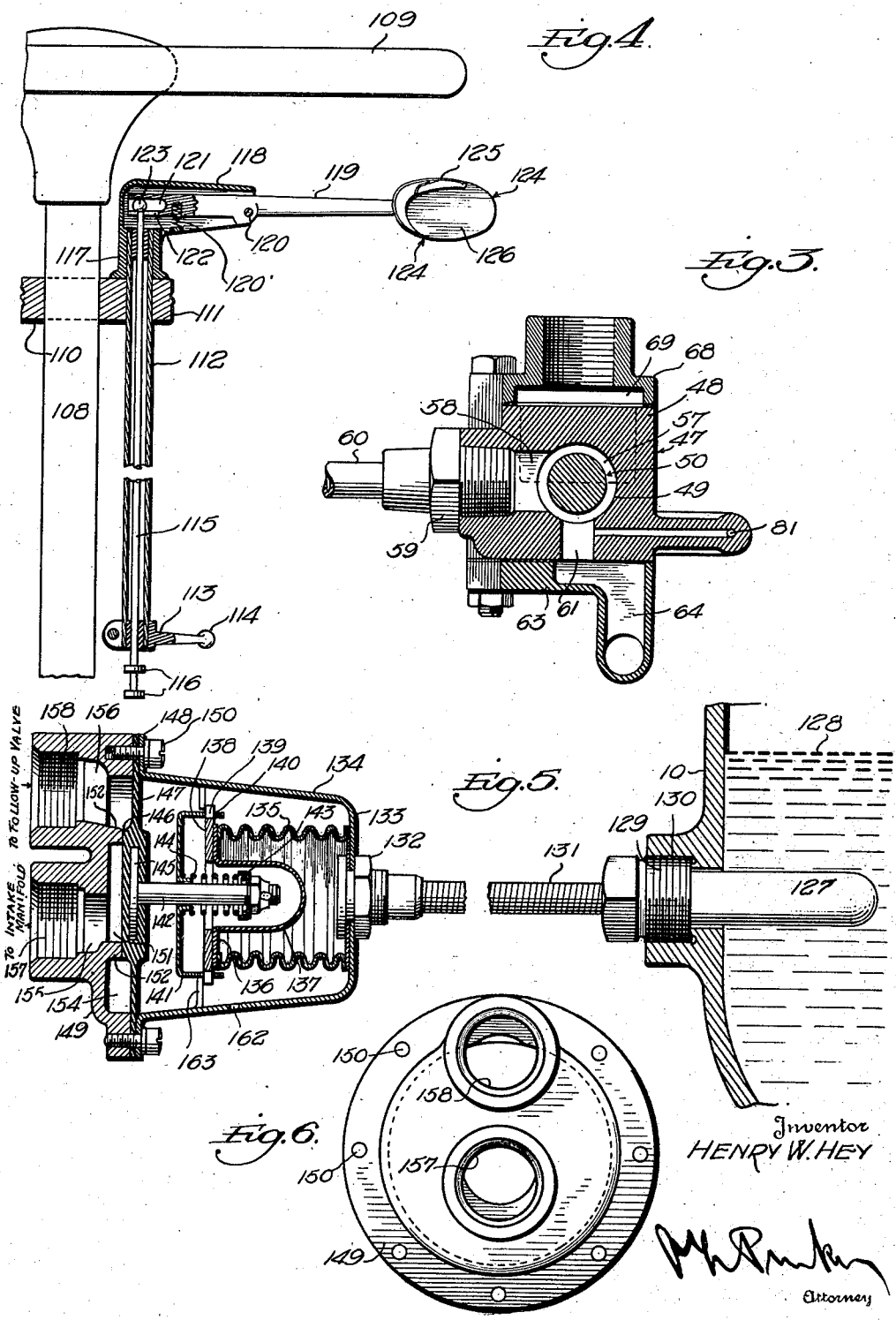

Feb. 4, 1941. H. W. HEY 2,230,777
GEAR SHIFTING MECHANISM
Filed March 15, 1938 4 Sheets-Sheet 3
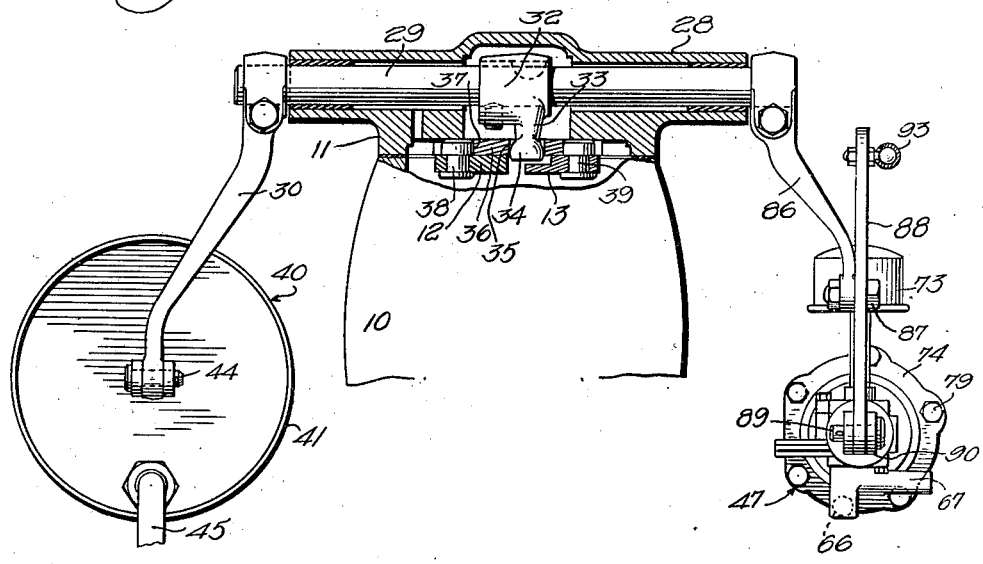
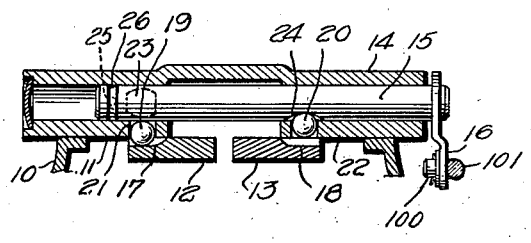
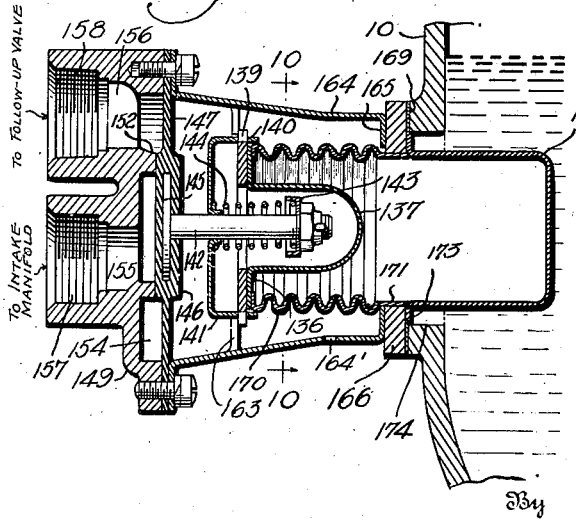
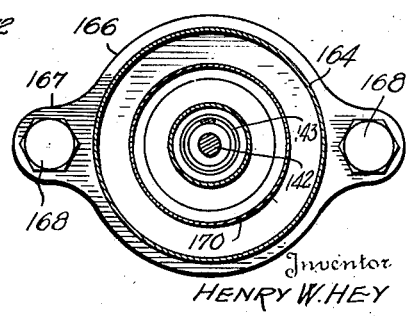
Inventor
HENRY W. HEY Feb. 4, 1941.  H. W. HEY  2,230,777
GEAR SHIFTING MECHANISM
Filed March 15, 1938   4 Sheets-Sheet 4
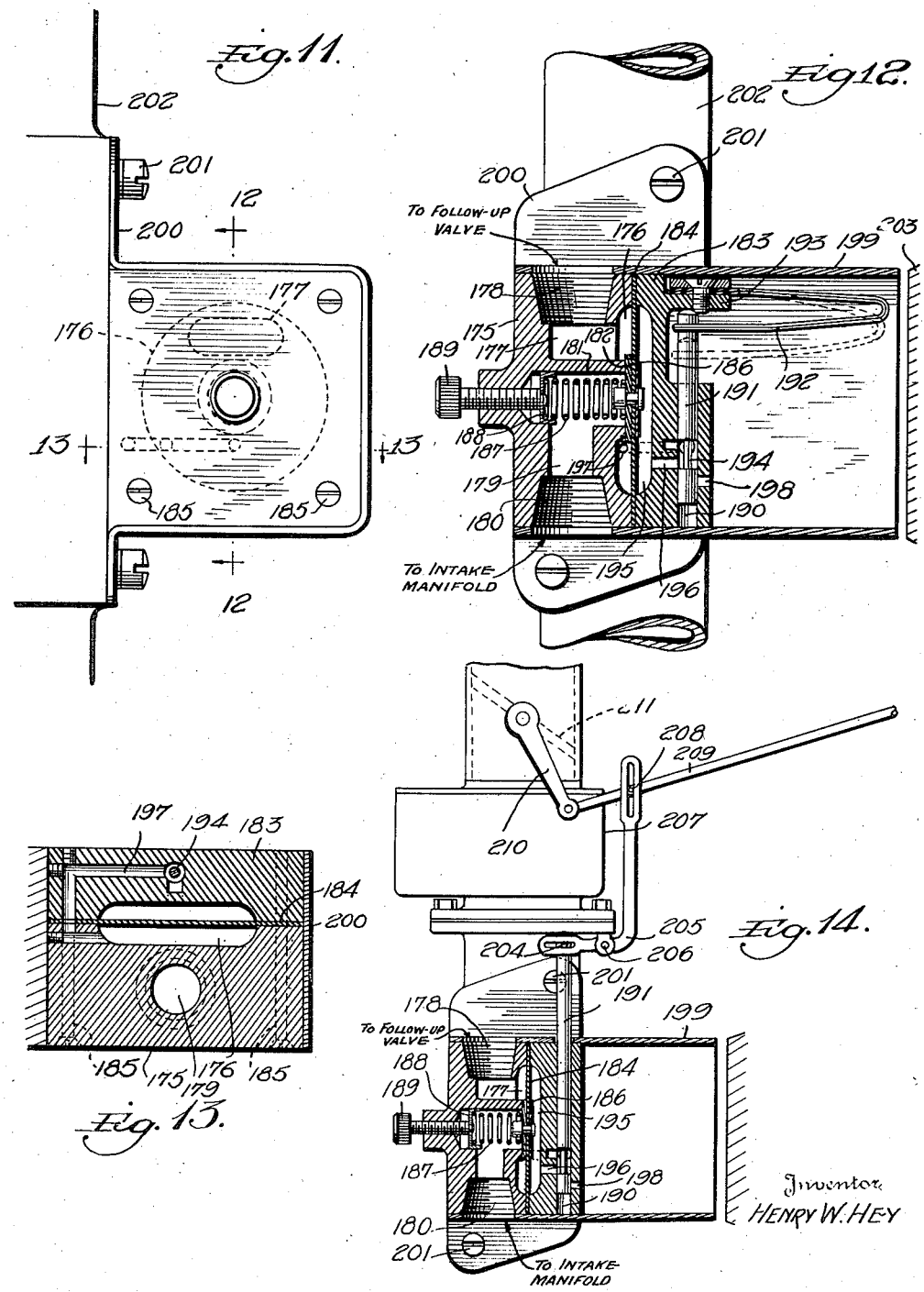
Inventor
HENRY W. HEY Patented Feb. 4, 1941

2,230,777

UNITED STATES PATENT OFFICE 2,230,777

GEAR SHIFTING MECHANISM

Henry W. Hey, Richmond, Va., assignor to Automatic Shifters, Inc., Richmond, Va., a corporation of Virginia Application March 15, 1938, Serial No. 196,083

23 Claims. (Cl. 74—335)

This invention relates to gear shifting mechanisms.

A number of power operated mechanisms have been developed for shifting the gears of motor vehicles most of which employ fluid pressure operated motors as the source of power. Such motors are adapted to be operated by being connected through suitable valve mechanisms with a source of fluid under pressure or to the intake manifold of the motor vehicle engine. Such mechanisms include both the preselective types which permit selection of a gear prior to disengagement of the clutch, and types wherein follow-up valves are provided for causing the shifting action to take place in accordance with the movement of a manually operated shifting lever.

Gear shifting mechanisms which are fluid pressure operated and controlled through the medium of a follow-up valve mechanism have been found to be highly advantageous in operation for several reasons. For example, they permit the gear shifting operations to be carried out in accordance with conventional practice, thus eliminating the necessity for the driver learning new modes of operation. Moreover, such mechanisms permit the floor boards of a vehicle to be cleared to facilitate the seating of three persons in the front seat and they greatly minimize the distance through which the operator must move his hand in performing the gear shifting operations.

One of the principal difficulties encountered in the development of gear shifting mechanisms of the type referred to lies in the extremely varying conditions under which the gear shifting operations must be performed. For example, when starting a vehicle in cold weather the transmission lubricant is highly viscous because of its low temperature and because it has "set" in the transmission casing, and substantial power is required for performing the shifting operations. Accordingly it is necessary that the shifting motor be of sufficient capacity to properly perform the shifting operations under such extreme conditions, when the transmission lubricant offers its maximum resistance to the operation of the shifting motor. On the other hand, after a motor vehicle has been driven for a few minutes, the viscosity of the transmission lubricant is greatly reduced either by becoming somewhat heated or by having its viscosity substantially reduced by being agitated in the transmission by the rotation of the gears therein, or both. Accordingly the resistance offered by the lubricant as an element opposing operation of the shifting motor is very materially reduced.

As a result of the substantial differences in the resistances offered to operation of the shifting motor, the power required for shifting when the vehicle motor is cold and the transmission lubricant is "set" is much greater than the power required for performing the shifting operations after the transmission lubricant has become warmer or its viscosity has been substantially reduced by agitation. This fact presents a substantial problem in the development of any motor vehicle gear shifting mechanism, and this is particularly true of mechanisms of the follow-up valve type.

Most transmissions now being manufactured for motor vehicles employ gear synchronizing means for second and high gears but not for low and reverse gears, it being necessary to effect sliding movement of a gear into mesh with another gear when selecting low or reverse gear for operation. In practice it has been found that if the shift is made into low or reverse gear too rapidly or with the application of excessive force, the gear being moved sometimes seizes on its shaft and renders it impossible to move the gear out of mesh for a subsequent shift. Moreover, the same improper shifting causes noisy clashing shifts and excessive wear, and mutilates the gears and dog clutches in the gear box. Therefore, it will be apparent that a gear shifting motor designed to provide the necessary force for shifting gears when the vehicle motor is cold and the transmission lubricant is highly viscous possesses far more power than is necessary for performing the shifting operations after the transmission lubricant has been heated to some extent or the viscosity of the lubricant has been reduced, and the use of such a motor sometimes results in the seizing of the gears in the manner described.

Moreover, follow-up valve mechanisms for shifting mechanisms of the type referred to are controlled by transmitting movement from a manually operable lever through various mechanical connections such as shafts, rods, linkages, etc., to the valve mechanism and other mechanical connections tend to reverse the valve mechanism in accordance with the operation of the shifting motor or elements operated thereby, to provide the necessary follow-up valve action. Where a shifting motor is over-powered, as when the transmission lubricant has become warmed, the shifting motor, in an efficient gear shifting mechanism, tends to over-run its intended position with relation to the manually controlled lever. In other words, an efficient follow-up valve mechanism, used in connection with a shifting motor of the necessary size, causes extremely rapid response of the shifting motor to movement of the shift lever with the result that the shifting motor will operate as rapidly as movement can be transmitted to the shift lever and such rapid movement of the motor sometimes causes it to over-run a position corresponding to the position of the shift lever when movement of the latter is stopped.

Accordingly it will be apparent that seizure of the gears may and sometimes does result, and in addition, the extremely rapid operation of the motor, acting through its related connection to the follow-up valve and to the shift lever, tends to produce slack in the connections between the mechanical elements through which motion is transmitted from the shift lever to the follow-up valve. As a result, it is extremely difficult to provide a quiet operation of mechanical connections between the shift lever and the control valve, such connections tending to cause clicking and rattling noises.

An important object of the present invention is to provide means for controlling the application of power for shifting a transmission in accordance with conditions existing in the transmission.

A further object is to provide novel means for limiting the generation of power in the shifting motor under normal operating conditions in which limited shifting power is required.

A further object is to provide means for controlling the functioning of a gear shifting motor in accordance with the resistance offered to operation of the shifting motor, and particularly the resistance offered to the shifting operations by the transmission lubricant.

A further object is to provide means whereby the operation of the shifting motor will be controlled to provide shifting power which is inversely proportional to the viscosity of the transmission lubricant in order to provide a uniform shifting operation under all conditions.

A further object is to govern the speed with which the shifting motor is permitted to respond to operation of the control valve mechanism in accordance with the temperature conditions in the transmission lubricant.

A further object is to provide a novel pressure control valve for determining the degree of connection of the shifting motor with the source of pressure fluid independently of the control valve mechanism and depending upon conditions present in the transmission.

A further object is to provide a valve operative for limiting differential pressures in the shifting motor by controlling connection of the shifting motor to a source of non-atmospheric pressure and wherein such valve is biased toward a position providing unlimited communication between the motor and the source, and to provide means for overcoming the biasing means to move the valve toward its seat in accordance with conditions present in the transmission.

A further object is to provide a control valve of the general character referred to which is automatically timed by operation of the vehicle engine to limit differential pressures in the shifting motor during operation of the shifting mechanism under normal conditions.

A further object is to provide a spring loaded pressure control valve for controlling communication between the shifting motor and the source of pressure fluid and to provide means for varying the spring loading of such valve in accordance with conditions present in the transmission to prevent any shifting operation from taking place at an excessive rate of speed.

A further object is to provide a control valve of the character referred to spring biased to open position and having a differential pressure operated member operable for urging the valve toward its seat against the tension of the spring in accordance with the pressure differential connected to the shifting motor and to provide means for rendering the differential pressure operated member inoperative before normal operating conditions are present in the transmission.

A further object is to provide a valve of the character referred to which is thermostatically controlled to determine its position and operation.

A further object is to provide a valve of the character referred to which is thermostatically controlled in accordance with the temperature of the transmission lubricant.

A further object is to provide an automatic control device of the character referred to which is particularly applicable in connection with a follow-up valve controlled shifting motor and which functions to eliminate noise in the motion transmitting connections through which the follow-up valve is operated.

A further object is to provide such a mechanism wherein the movement of the shifting motor is caused to lag to a minor extent behind the movement which is manually transmitted to the follow-up valve but wherein such lagging is sufficient to prevent the motor from over-running its intended position, thus preventing shifting at an excessive speed and causing slack to be taken up in the mechanical connections through which the follow-up valve is operated to prevent noise from being generated in such connections.

A further object is to provide a mechanism of this character which is particularly adapted for use in connection with a manually controlled follow-up valve shifter wherein means is provided for transmitting "feel" to the shift lever.

Other objects and advantages of the invention will become apparent during the course of the following description.

Figure 2:
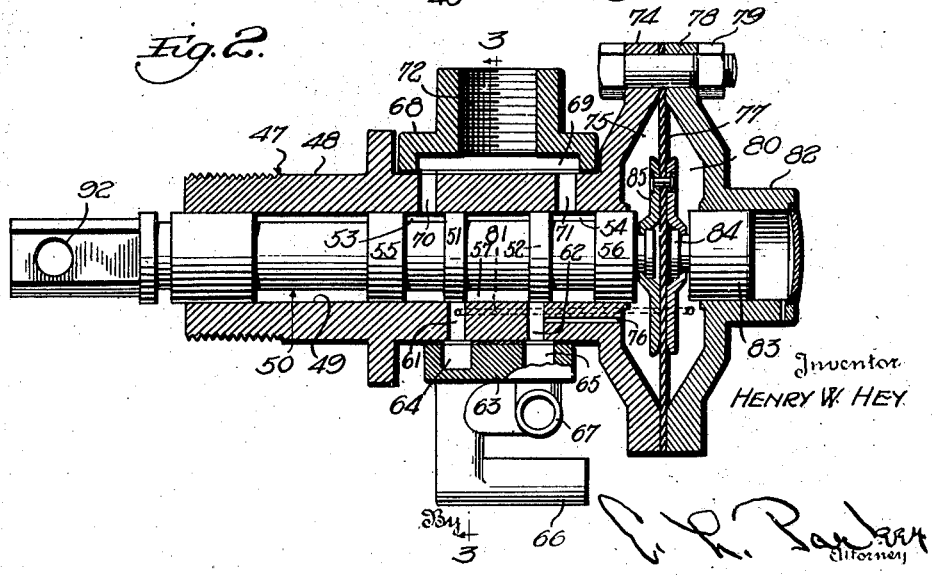

In the drawings I have shown several embodiments of the invention. In this showing:

Figure 1 is a perspective view of the mechanism associated with parts of a motor vehicle, Figure 2 is a central vertical longitudinal sectional view through the follow-up valve mechanism, Figure 3 is a section on line 3—3 of Figure 2, Figure 4 is a vertical sectional view through a control handle mechanism employed in conjunction with the steering wheel, the latter and the steering column being shown in elevation, Figure 5 is a vertical sectional view taken transversely of the transmission, showing a portion of the casing of the latter and the thermostatically controlled valve associated therewith, Figure 6 is a face view of the thermostatically controlled valve mechanism, Figure 7 is a transverse sectional view of a portion of the vehicle transmission mechanism taken substantially on line 7—7 of Figure 1, Figure 8 is a similar view on line 8—8 of Figure 1, Figure 9 is a sectional view similar to Figure 5 showing a modified form of the invention, Figure 10 is a section on line 10—10 of Figure 9, Figure 11 is a side elevation of another form of the invention shown attached to the intake manifold, Figure 12 is a section on line 12—12 of Figure 11, Figure 13 is a section on line 13—13 of Figure 11, and, Figure 14 is a further modification of the invention shown in a sectional view similar to Figure 12 and connected to the carburetor choke operating mechanism.

Referring to Figures 1, 7 and 8, the numeral 10 designates a motor vehicle transmission provided with a cover plate 11, and the transmission contains the usual gearing for determining the driving ratio between the vehicle engine and the rear wheels of the vehicle. The driving ratio is determined by the selective shifting of the usual low and reverse gear shift rail 12 and the second and high gear shift rail 13.

In the present construction, means are provided for locking either shift rail against movement in neutral position and for applying a force tending to move both shift rails, the locking means functioning to prevent movement of one shift rail and thus permit movement of the other shift rail. Referring to Figure 8, the numeral 14 designates a bearing formed in the cover plate 11 and receiving a rock shaft 15 provided at one end with a crank 16 whereby it may be rocked between predetermined positions in a manner to be described.

The shift rails 12 and 13 are respectively provided with milled grooves 17 and 18, as shown in Figure 8. These grooves are adapted to respectively receive locking elements 19 and 20 which are vertically movable in openings 21 and 22 formed in the bottom of the bearing 14. The shaft 15 is provided with circumferentially offset notches 23 and 24 adapted to selectively receive the balls 19 and 20, depending upon the turned position of the shaft 15. It will be apparent that the ball receiving notches are arranged in the vertical planes of the respective locking elements or balls 19 and 20, the shaft 15 being fixed against longitudinal movement to maintain it in proper position by a screw 25 engageable in a groove 26 formed in the shaft. In this connection, it will be apparent that the shaft 15 is adapted to project from either end of the bearing 14, depending upon the side of the transmission at which it is most convenient to operate the crank 16, the opposite end of the bearing 14 being closed by a cap 27.

When the shaft occupies the position shown in Figure 8 the locking member 19 engages a cylindrical portion of the shaft and thus is maintained in the groove 17 to lock the shift rail 12 against movement, the locking member 20 being freely movable upwardly into the notch 24 to permit the shift rail 13 to be moved longitudinally into either second or high gear position. Similarly, the crank 16 may be operated to turn the notch 23 into registration with the locking member 19 and to turn the notch 24 out of registration with the locking member 20. Under such conditions the locking member 20 will engage a cylindrical portion of the shaft 15 to be held thereby in engagement with the notch 18, thus preventing movement of the shift rail 13. At the same time, the locking member 19 will be freely movable upwardly into its notch 23, thus releasing the shift rail 12 for operation. The shaft 15 can be turned between the two positions referred to only when both shift rails are in neutral position, as will become apparent.

Referring to Figures 1 and 7 it will be noted that the cover plate 11 is provided adjacent the bearing 14 with a preferably larger and longer bearing 28 in which is mounted a rock shaft 29. This shaft projects from both ends of the bearing 28 and is provided on one end with an operating crank 30. The bearing 28 is formed in two sections the inner ends of which are spaced, and between the bearing sections a hub or sleeve 32 is secured to the shaft 29 and is provided with a depending crank 33 the lower end 34 of which is formed substantially spherical. The lower end 34 of the crank engages in an opening 35 formed in a whiffletree lever 36 the ends of which are notched as at 37 to receive the upper ends of pins 38 and 39 secured to the respective shift rails 12 and 13.

In most transmissions it is now the common practice to provide synchronizing means in connection with second and high gears but not in connection with low and reverse gears, and the latter gear ratios are provided by sliding gears into mesh with each other. Accordingly the necessary distance of travel of the shift rail 12 is greater than that of the shift rail 13, and for this reason the crank 33 is arranged to one side of the center of the distance between the two shift rails in order that a given rocking movement of the shaft 29 will move the low and reverse gear shift rail 12 to a greater extent than the shift rail 13 to compensate for the different necessary travels of the shift rails.

A differential fluid pressure motor 40 is employed for rocking the shaft 29. This motor comprises a cylinder 41 having a piston 42 therein provided with a connecting rod 43 projecting from one end of the cylinder and pivotally connected as at 44 (Figure 7) to the full end of the crank 30. Pressures in the end of the motor cylinder are controlled through pipes 45 and 46 (Figure 1).

A control valve mechanism for the motor 40 is shown in Figures 1, 2 and 3 and is indicated as a whole by the numeral 47. Referring to Figures 2 and 3, the valve mechanism comprises a valve body 48 having a cylindrical bore 49 therethrough in which is slidable a valve indicated as a whole by the numeral 50. This valve is provided with a pair of spaced heads 51 and 52 and fluid pressure spaces 53 and 54 are defined between these heads and a second pair of heads 55 and 56. A vacuum space 57 is provided between the heads 51 and 52.

The valve body 48 is provided in one side thereof with a vacuum passage 58 into which is tapped a union 59 connected to one end of a vacuum pipe 60. This pipe leads to the intake manifold as the source of vacuum for operating the motor 40 through an auxiliary control valve mechanism to be referred to in detail later. The port 58 communicates with the vacuum space 57 to maintain this space in communication with the intake manifold, and longitudinal movement of the valve 50 is adapted to connect the vacuum space 57 to either of a pair of ports 61 or 62.

A manifold 63 is secured against the bottom of the valve body 48 as shown in Figures 2 and 3. This manifold has passages 64 and 65 communicating with the respective ports 61 and 62. The passage 64 extends downwardly and rearwardly through an extension 66 which is connected to the pipe 46, while the port 65 extends downwardly and laterally away from the transmission through an extension 67 which is connected to the pipe 45. Thus it will be apparent that the port 62 communicates with the forward or left hand end of the cylinder 41 while the port 61 communicates with the rear or left hand end of the cylinder 41.

Both of the valve spaces 53 and 54 are in constant communication with the atmosphere and accordingly movement of the valve 50 in one direction connects one of the ports 61 or 62 to the vacuum space 57 while the other port is connected to the atmosphere through one of the spaces 53 or 54. Referring to Figures 2 and 3, the numeral 68 designates a manifold secured against the top of the valve body 48 and provided with a passage 69 communicating through ports 70 and 71 with the respective valve spaces 53 and 54. The manifold 68 is provided with a tapped opening 72 to receive the lower end of an air cleaner 73.

One end of the valve body 48 is provided with an enlarged flange 74 having a chamber 75 therein communicating with the port 62 through a small passage 76. A flexible diaphragm 77 is arranged against the flange 74 and a flange 78, similar to the flange 74, is arranged against the diaphragm 77, the two flanges being secured together against opposite faces of the diaphragm by bolts 79. The flange 78 forms a chamber 80 at the adjacent side of the diaphragm 77 and this chamber communicates with the port 61 through a passage 81 (Figures 2 and 3). Accordingly it will be apparent that pressures in the chambers 75 and 80 will be the same at all times as the pressures in the respective ports 62 and 61.

The flange 78 carries an axial cylinder 82 in which is slidable a head 83, and this head, and the adjacent end of the valve 50, are provided with flanges 84. These flanges are engaged by the inner offset edges of disk members 85 secured against opposite faces of the diaphragm 77. This arrangement equalizes the areas of the various parts which are controlled by pressures in the chambers 75 and 80 and these pressures are utilized for providing "feel" in the manually operable mechanism to be described through which the valve 50 is operated.

As stated, a manually operable mechanism is provided for operating the valve 50 and operation of this valve energizes the motor 40. Movement of the piston 42 and the parts operated thereby is then utilized for tending to reverse the operation of the valve 50 whereby the motor partakes of a follow-up action with respect to the manually operable mechanism. Referring to Figures 1 and 7, the numeral 86 designates a crank carried by one end of the rock shaft 29. The crank 86 may be arranged on the same end of the shaft 29 as the crank 30 or may be arranged at the opposite end as shown in Figure 1. The other end of the crank 86 is pivotally connected as at 87 to a floating lever 88 intermediate the ends of the latter. The lower end of the lever 88 is pivotally connected as at 89 to a yoke 90 formed on the forward end of a link 91, the rear end of this link being pivotally connected as at 92 to the forward end of the valve 50.

The upper end of the floating lever 88 is connected as at 93 to the rear end of a link 94, the connection 93 preferably being in the form of a conventional ball and socket connection to permit free rocking of the transmission with the vehicle power plant in the resilient mountings usually provided for this purpose. The forward end of the link 94 has a similar ball and socket connection 95 with the lower arm 96 of a bell crank lever 97 which is pivotally supported intermediate its ends as at 98. The other arm of the bell crank lever is forked or slotted as at 99 whereby the lever 97 may be rocked in a manner to be described to move the floating lever 88.

The lower end of the crank 16 has connection as at 100 with the rear end of a link 101. The forward end of this link is connected as at 102 with the lower arm 103 of a bell crank lever 104, this lever being pivotally supported intermediate its ends as at 105. The other arm 106 of the lever 104 is provided with a fork 107 the ends of which are substantially circular for a purpose to be described.

A suitable manually operable mechanism for actuating the bell crank levers 97 and 104 is shown in Figures 1 and 4. A conventional steering column 108 is provided at its upper end with the usual steering wheel 109. A supporting collar 110 surrounds and is secured to the steering column adjacent the upper end thereof and is provided with a laterally extending portion 111 forming a bearing for a sleeve 112. Similar bearing means (not shown) for the lower end of this sleeve also may be secured to the steering column. The lower end of the sleeve 112 carries a crank arm 113 terminating in a ball 114 receivable in the forks 99, and accordingly it will be apparent that rocking movement of the sleeve 112 will rock the bell crank lever 97 about its pivot.

An axially movable rod 115 is mounted within the sleeve 112 and is provided adjacent its lower end with a pair of disks 116 between which the circular members 107 of the bell crank lever 104 are arranged, the forked end of this lever straddling the rod 115.

A sleeve 117 surrounds and is secured to the upper end of the sleeve 112 and has its lower end contacting with the upper face of the bearing 111. At its upper end, the sleeve 117 is provided with a lateral extension 118 which is preferably of inverted U shape in cross section and receives the inner end of a manual lever 119, the lever being pivotally connected to the extension 118 as at 120. The inner end of the lever 119 is provided with a cylindrical opening 121 having an opening 122 in the bottom thereof sufficiently large to permit the rod 115 to extend therethrough, and the rod 115 is provided at its upper end with a ball 123 arranged in the opening 121.

The outer end of the lever 119 is provided with an operating handle indicated as a whole by the numeral 124. This handle is provided with an upper flange portion 125 (Figures 1 and 4) arranged below the outer extremity of the steering wheel and in a plane approximately parallel to the plane of the steering wheel. It will be noted that the outer edge of the flange 125 lies substantially beneath the outer extremity of the steering wheel 109. Beneath such flange and perpendicular thereto is a flange 126 which extends radially outwardly beyond the flange 125 for a purpose to be described. The handle 124 and associated elements form no part of the present invention, but are described and claimed in my U. S. Patent No. 2,161,778, issued June 6, 1939.

In Figures 5 and 6 of the drawings there is illustrated a thermostatic mechanism for controlling communication between the vacuum pipe 60 and the intake manifold. Referring to Figure 5, the numeral 127 designates a bulb projecting into the transmission and immersed in the lubricant 128 therein. This bulb is carried by a plug 129 threaded in an opening 130 in the side of the transmission casing. The interior of the bulb communicates with a preferably armored flexible tube 131.

The other end of the tube 131 is provided with a fitting 132 securing it to the end wall 133 of a casing 134 and within such casing an expansible diaphragm 135 is secured against the end wall 133 and communicates with the tube 131. The bulb 127, tube 131 and expansible diaphragm 135 are filled with a fluid having a high coefficient of expansion as will be apparent. A closure member 136 is provided for the inner end of the diaphragm 135 and this member is provided with a closed axially extending portion 137 extending into the diaphragm 135. A plate 138 is secured against the face of the closure member 136 and is provided with outwardly extending fingers 139 engageable in openings 140 in a cup member 141.

A stem 142 extends freely through the cup member 141 and is provided at one end with a spring cup 143 receiving one end of a compression spring 144 which surrounds the stem 142, the other end of the spring engaging the cup member 141. The other end of the stem 142 is provided with an integral disk 145 embedded in a molded elastic valve member 146. This member extends radially outwardly in the form of a diaphragm 147 the extremity of which is arranged against a flange 148 formed at the end of the casing 134.

A preferably cast head 149 is arranged against the diaphragm 147 and is secured in position by screws 150 passing through the flange 148 as shown in Figure 5. The head 149 is shown as being provided with a central recess 151 surrounded by a valve seat 152 against which the valve 146 is adapted to seat.

The valve seat 152 is surrounded by an annular recess 154 adapted to communicate with the recess 151 in accordance with the position of the valve 146. The passages 151 and 154 are respectively provided with ports 155 and 156 extending into tapped openings 157 and 158. These openings are adapted to receive unions 159 and 160, the latter of which is connected to the pipe 60 as shown in Figure 1. The union 159 is connected to a pipe 161 leading to the intake manifold.

The valve 146 engages its seat 152 under certain conditions, as will be referred to in detail later. The loading of the spring 144 varies in accordance with the temperature of the lubricant 128, thus partly determining the position of the valve 146, the position of this valve being further governed by differential pressures existing on opposite faces of the valve and its diaphragm portion 147. In this connection it will be noted that the casing 134 is vented to the atmosphere and for this purpose the casing has been shown in Figure 5 as having a vent opening 162. The spring 144 is progressively unloaded as the lubricant temperature increases, as will become apparent, and the unloading of the spring is limited by stops 163 engageable with the fingers 139.

The form of the thermostatic control mechanism shown in Figure 5 is advantageous because of the flexibility of location of the casing 134 and associated elements. This casing may be arranged wherever desired, and although, for the purpose of illustration, it has been shown arranged separately from any of the other structural portions of the apparatus, the casing 134 may be conveniently supported with respect to the valve mechanism 47. It will be noted that the connection of the tube 131 to the transmission requires very little space and this is often advantageous because of the limited space which is frequently available at such point, particularly in view of the necessity in some motor cars of mounting the valve mechanism in close proximity to the transmission.

In Figures 9 and 10 a modified form of heat control mechanism has been shown wherein the entire mechanism is connected to and supported by the transmission housing. In such form of the invention most of the elements are identical with the corresponding elements shown in Figure 5 and need not be described in detail. Instead of employing the casing 134 with its closed end, the form of the invention in Figure 9 comprises a casing 164 vented as at 164' and having an internal flange 165 secured to an attaching flange 166 having ears 167 (Figure 10) through which screws 168 pass to attach the flange 166 to the transmission casing, the latter having a seat 169 which may correspond in shape to the flange 166 and its attaching ears.

Instead of the expansible diaphragm 135, the modified form of the mechanism employs a corresponding diaphragm 170 which is open at its inner end, such end of the expansible diaphragm having a cylindrical flange 171 extending through and secured in the opening in the flange 166. A bulb 172 is provided at its free edge with a flange 173 welded or otherwise secured against the inner face of the flange 166. This bulb extends into the transmission through an opening 174 in the transmission casing and is preferably immersed in the lubricant to be influenced by the temperature therein, the bulb 172 and expansible diaphragm containing a fluid having a high coefficient of expansion.

As previously stated, the substantial resistance offered to the shifting movement when a vehicle engine is cold and the vehicle has been standing for some time is overcome in either or both of two ways, namely, through the heating of the transmission lubricant or through the agitation or breaking up of the body of the lubricant, for example, by permitting the vehicle engine to warm up for a few minutes with the clutch engaged.

In the forms of the invention previously described, the functions of the various parts are controlled in accordance with the temperature of the transmission lubricant, and this lubricant becomes sufficiently warm in a very few minutes by the conduction of heat from the motor and by the generation of frictional heat in the body of the lubricant. The devices are so adjusted that it requires only a few degrees increase in temperature to expand the fluid in the thermostat sufficiently to release the loading of the spring 144 to permit the valve 146 to assume its normal position.

Inasmuch as it is not necessary to depend upon the temperature of the transmission lubricant to provide the desired results, the form of the invention shown in Figures 11, 12 and 13 has been found to be particularly efficient in operation. The numeral 175 designates a valve body having a circular recess 176 provided with a port 177 adapted to be connected to the pipe 60 which leads to the valve mechanism 47, the valve body having a threaded opening 178 to receive a suitable union (not shown) by means of which the pipe 60 may be connected to the valve body. A passage 179 also is formed in the valve body and is provided with a threaded opening 180 to receive a suitable union whereby the vacuum pipe 161 may be connected to communicate with the passage 179. An axial passage 181 communicates with the passage 179 and leads through a valve seat 182 arranged axially with respect to the recess 176.

A plate 183 is arranged adjacent and forms, in effect, a part of the valve body, as shown in Figure 12. A flexible diaphragm 184 is arranged between the valve body 175 and plate 183, these elements being secured to each other by suitable fastening elements such as screws 185 (Figure 13). A valve 186 is carried by the diaphragm 184 and is adapted to regulate the passage of air past the valve seat 182. A compression spring 187 has one end engaging the inner face of the valve 186 and the opposite end of this spring is arranged in a cup 188 carried by an adjusting screw 189 through which the tension of the spring 187 may be adjusted.

The plate 183 is provided with an opening 190 in which is slidable a valve 191 the upper end of which is engaged by one end of a bi-metallic thermostat 192, the other end of the thermostat being anchored to a projection 193 formed integral with the plate 183. The valve 191 is provided with a reduced shank 194 for a purpose to be described.

The plate 183 is provided with a circular recess 195 and the diaphragm 184 is influenced under certain conditions to be described by differential pressures in the recesses 176 and 195.

A port 196 is connected between the valve opening 190 and the recess 195 and is in constant communication with the space around the valve shank 194. As shown in Figures 12 and 13, a passage 197 connects the recess 176 with the valve opening 190 and when the valve 191 is in the position shown in Figure 12, it will be apparent that the passages 196 and 197 afford communication between the diaphragm chambers 195 and 176, and accordingly pressures will be balanced on opposite sides of the diaphragm 184. When the valve 191 is moved downwardly in the manner to be described, the portion of the valve above the shank 194 will close communication between the adjacent ends of the passages 196 and 197 and the passage 196 will be opened to the atmosphere around the shank 194 through a port 198.

The valve mechanism is supported in the desired position in any suitable manner. In the present instance, the mechanism is shown as being provided with a sheet metal or similar casing 199 provided with ears 200 secured as at 201 to a part of the intake manifold 202. A part of the casing 199 extends laterally from the valve mechanism and houses the thermostat 192, and the end of such portion of the housing 199 is open and arranged adjacent some portion of the motor vehicle engine to render the thermostat subject to heat generated thereby. In the present instance, the end of the casing 199 is shown as being arranged adjacent the cast pad 203 forming a part of the exhaust manifold and commonly employed for controlling the carburetor.

The valve mechanism shown in Figure 14 is identical with the mechanism shown in Figures 11, 12 and 13 except that the valve 191 is not heat controlled. Referring to Figure 14, it will be noted that the valve 191 extends upwardly through the casing 199 and is pivotally connected at its upper end as at 204 to one end of a bell crank lever 205 pivotally supported as at 206 to a suitable portion of the carburetor 207. The pivot 204 may be of any suitable type such as the pin and slot arrangement shown to permit the bell crank lever to swing about its pivot 206. The other arm of the bell crank lever is similarly pivotally connected as at 208 with the carburetor hand choke rod 209 which is connected in the usual manner to a crank 210 which operates the butterfly choke valve 211. This valve is shown in full choking position under which conditions the valve 191 will occupy the position shown in Figure 14.

The operation of the form of the invention shown in Figures 1 to 8 inclusive is as follows:

Aside from the functioning of the heat control mechanism and its bearing on the shifting mechanism as a whole, the apparatus operates in accordance with the disclosure in the copending application of John A. Lawler, Serial No. 179,604, filed December 13, 1937. In this connection it is pointed out that the main valve mechanism 47, the control mechanism for the valve mechanism, including the manual lever 119 and associated elements, and the shifting and shift rail locking mechanisms shown in Figures 7 and 8 form no part of the present invention except in combination with the mechanisms shown in Figures 5, 6 and 9 to 14 inclusive, which function to control other parts of the apparatus depending upon the resistances encountered by the shifting motor in performing its intended functions.

Assuming that all of the parts of the apparatus are in neutral position with the vehicle at rest and it is desired to start the vehicle in motion, the operator will depress the conventional clutch pedal (not shown), preparatory to shifting into low gear. This is accomplished by the operator engaging one or two fingers beneath the flange 125 to lift the lever 119 toward the steering wheel, which action results in selecting the low and reverse gear shift rail 12 for operation, followed by engagement of a finger of the operator against the upper or forward face of the flange 126 to move the lever 119 rearwardly. In this connection, it is pointed out that a biasing spring, such as the spring 120' shown in Figure 4, tends to hold the free end of the lever 119 in the lower position, thus normally selecting the second and high gear shift rail for operation.

When the operator performs the first of the two movements of the lever 119 referred to, namely, the movement of this lever upwardly toward the steering wheel, the inner end of the lever 119 will move the stem 115 downwardly thus swinging the bell crank lever 104 in a clockwise direction as viewed in Figure 1. This action transmits a forward pull through the link 101 to the crank 16 to rock this crank in a clockwise direction, thus turning the shaft 15 to a position wherein the notch 24 is turned out of registration with the locking member 20 and with the notch 23 arranged directly above the locking member 19. Under such conditions a cylindrical portion of the shaft 15 will engage the locking member 20 to hold it in the groove 18 and thus lock the second and high gear shift rail 13 against movement. At the same time, the positioning of the notch 23 above the locking member 19 renders such member free to move upwardly if a force is transmitted to the low and reverse gear shift rail to move the latter longitudinally.

If the operator now pulls the lever 119 rearwardly to the low gear position as stated, the sleeve 112 will be rocked in a clockwise direction looking downwardly thereon, and through the medium of the crank 113, the bell crank lever 97 will be rocked in a clockwise direction as viewed in Figure 1. Since the motor 40 at this time will be inoperative with its piston stationary, it will be apparent that the shifting shaft 29 and the crank 86 likewise will be stationary, thus providing a momentarily stationary pivot 87 for the lever 88. The rocking movement of the bell crank lever 97 referred to transmits a forward pull through the link 94 to the upper end of the lever 88, thus turning this lever in a counter-clockwise direction as viewed in Figure 1. Thus the lower end of the lever 88 and consequently the valve 50 will be moved rearwardly from the neutral position shown in Figure 2. Under such conditions, the valve head 52 will move to the right of the position shown in Figure 2 to connect the port 62 to the vacuum space 57, thus exhausting air from the forward or left hand end of the cylinder 41 through the pipe 45. At the same time the valve head 51 also will move to the right of its position in Figure 2, thus connecting the port 61 to the air space 53 to admit air into the rear or right end of the cylinder 41 through the pipe 46.

Accordingly the piston 42 will start to move forwardly or to the left in Figure 1 to turn the crank 30 and shaft 29 in a clockwise direction. This action rocks the crank 33 toward the operator as viewed in Figure 7 to transmit movement to the whiffletree lever 36. Inasmuch as the second and high gear shift rail will have been locked in the manner described, the lever 36 will fulcrum on the upper end of the pin 39 and the opposite end of the lever 36 will transmit movement to the shift rail 12 to move it toward low gear position.

As previously stated the movement manually transmitted to the floating lever 88 under the conditions being considered moves the rear end of this lever rearwardly and upon actuation of the shaft 29 in the manner referred to movement of this shaft will be transmitted through the crank 86 to the pivot pin 87 to move this element forwardly and thus counteract rearward movement of the pivot pin 89. The valve 50, having been moved to the right of the position shown in Figure 2 in the manner described, it will remain approximately in the same position due to the follow-up action provided through the crank 86 and pivot pin 87. As soon as rearward and downward movement of the lever 119 is stopped a slight movement of the piston 42 thereafter will move the pivot pin 87 forwardly to a slight extent while the lever 88 fulcrums about the pivot 93, thus returning the valve 50 to the normal position shown in Figure 2. Thus upon continued movement of the lever 119 toward low gear position there will be continued movement of the motor piston 42 and the parts connected thereto until low gear position is reached. Any suitable means (not shown) may be provided for limiting movement of the lever 119 to each of its operative positions. Accordingly when the low gear position of the lever 119 is reached, the very slight additional movement of the piston 42 necessary to return the valve 50 to its neutral position will move the gears completely into low gear position.

After sufficient momentum of the vehicle has been attained in low gear, the operator may disengage the clutch in the usual manner and then move the lever 119 to second gear position. This may be accomplished by engagement of one finger of the operator against the rear or lower side of the flange 126. By pushing upwardly and forwardly on this flange the lever 119, sleeve 112, crank 113 and the remainder of the motion transmitting elements of the valve 50 will be reversed with relation to their operation when shifting into low gear. In other words, the floating lever 88 will be rocked in a clockwise direction to move the valve 50 to the left as viewed in Figure 2, thus opening the port 61 to the vacuum space 57 and opening the port 62 to the air space 54.

When neutral position of the lever 119 is reached, further movement of this lever parallel to the plane of the steering gear will be momentarily arrested, whereupon the motor piston 42 will restore the normal position of the valve 50 and then stop. Without any movement on the part of the operator the lever 119 will drop downwardly at right angles to the plane of the steering wheel when neutral position is reached due to the operation of the biasing spring 120' (Figure 4). This movement reverses the previously described operation of the selecting shaft 15, thus restoring it to the position shown in Figure 8. Under such conditions, a cylindrical portion of the shaft 15 will hold the locking member 19 in engagement with the shift rail 12 while the locking member 20 will be free to move upwardly into the notch 24 when force is applied to the shift rail 13.

After the second and high gear shift rail has been selected for operation in the manner stated, the operator, engaging the flange 126 with his finger, may continue to move the lever 119 forwardly and upwardly parallel to the plane of the steering wheel. Such movement of the lever 119 operates the valve mechanism 47 in exactly the same manner as this mechanism is operated when shifting from low gear to neutral in the manner described, and this operation need not be repeated. The motor 40 will be energized to move the piston 42 rearwardly, thus transmitting force to the whiffletree lever 36. Instead of actuating the shift rail 12, however, the lever 36 will fulcrum on the upper end of the pin 38, in view of the locking of the shift rail 12, and the other end of the lever will transmit movement to the upper end of the pin 39 to move the shift rail 13 into second gear position.

The vehicle clutch then may be engaged and the vehicle accelerated in second gear in the usual manner, whereupon the operator may move the lever 119 downwardly and rearwardly parallel to the plane of the steering wheel 109 to the high gear position. This movement may be accomplished by engagement of one finger of the operator against the forward or upper face of the flange 126 without transmitting movement to the lever 119 at right angles to the steering wheel. Under such conditions, the second and high gear shift rail 13 will remain selected for operation while the shift rail 12 will be locked, and the valve 50 and associated parts will operate in accordance with the selection of low gear, the piston 42 moving from the rear end of the motor cylinder 41 to the forward end thereof, thus causing the rocking of the shaft 29 to move the shift rail 13 from the second to the high gear position.

The selection of reverse gear will be obvious from the foregoing description, it merely being necessary to move the lever 119 upwardly toward the steering wheel in neutral position to select the shift rail 12 for operation in the manner described in connection with low gear. The lever 119 then may be moved forwardly and upwardly or parallel to the plane of the steering wheel, in which case the functioning of the shifting mechanism will be the same as for second gear except that the shift rail 12 will be actuated instead of the shift rail 13, thus providing reverse gear. As previously stated, all of these various gear shifting operations take place in accordance with the disclosure of the application of John A. Lawler, Serial No. 179,604, referred to above.

The connection of the diaphragm chambers 75 and 80 to the respective passages 62 and 61 causes the diaphragm chambers to be subjected to the same pressures as are present in opposite ends of the cylinder 41. Thus the differential pressures in the motor 40 will be reproduced on opposite sides of the diaphragm 77 to resist manual operation of the valve 50 to a degree which is always exactly proportional to the resistance encountered by the piston 42 in its movement. When this piston is relatively free to move substantial differential pressures will not be built up on opposite sides of the piston since it tends to move freely toward the end of the cylinder in which pressure is reduced, thus progressively reducing the volume of such end of the cylinder in proportion to the rate at which air is being exhausted therefrom. Under such conditions there will be the same proportionate resistance to movement of the valve 50.

When the piston 42 encounters resistance, as when disengaging the usual spring detents associated with the transmission shift rails, or when initially engaging the gear synchronizing means of the transmission, the momentary retarding of the piston 42 is immediately followed by a further reduction in the pressure in the end of the cylinder 41 which is connected to the intake manifold, thus building up increased differential pressures to overcome the resistance encountered by the motor piston. These increased differential pressures are reproduced on opposite sides of the diaphragm 77, thus offering increased resistance to the movement of the valve 50 and consequently of the lever 119.

Thus this lever is provided with "feel" which is exactly proportional to the resistance encountered in the shifting operation. Accordingly conventional gear shifting is accurately simulated and the operator may feel his way into gear in accordance with conventional practice. The mechanism through which "feel" is provided performs an additional function in that it causes the operator to perform a predetermined proportionate amount of the work in any given shifting operation. It will be apparent that when the operator moves the lever 119 to move the link 94 (Figure 1) to the left, for example, the valve 50 will be moved to the right against the pressure present in the diaphragm chamber 80 (Figure 2). Accordingly the operator must move the handle 119 against the differential pressure affecting the diaphragm 77, and the force exerted by the hand of the operator is transmitted to the pivot 87 to tend to turn the crank 86 in a clockwise direction. If movement is transmitted to the link 94 to move it toward the right as viewed in Figure 1, the reverse will be true since differential pressure will tend to move the diaphragm 77 toward the right as the operator moves the valve 50 toward the left. Under such conditions the force of the operator's hand will tend to turn the crank 86 in a counterclockwise direction. The differential pressures affecting the diaphragm 77 will be the same as the pressures on opposite sides of the motor piston and will determine the force which the operator must exert to move the handle 119, and accordingly the operator will transmit to the crank 86 a manual force which is always in direct proportion to the power generated by the motor 40. The features of providing "feel" in the manual shift lever and of causing the operator to perform a proportional amount of the work of shifting form no part of the present invention per se but are described and claimed in my copending application Serial No. 169,288, filed October 15, 1937.

As previously stated, an apparatus operated in accordance with the present disclosure and without the use of one of the auxiliary valve mechanisms shown in Figures 5 and 6, and 9 to 14 inclusive has been found to be highly efficient in operation. In one sense it may be considered that such an apparatus is too efficient for practical purposes. For example, it has been found that the valve mechanism 47 and the shifting motor 40 are normally so instantaneously responsive to operation of the lever 119 that the operator may cause the shifts into different gear positions to take place too rapidly, with consequent disadvantageous results. For example, there is actual shifting of one gear into mesh with another gear when the shift is made into low or reverse and if the shift is made too rapidly or too forcibly, it sometimes occurs that the gear being shifted will seize on its shaft, thus locking the gear set against movement. Moreover, the same improper shifting causes noisy clashing shifts and excessive wear, and mutilates the gears and dog clutches in the gear box. This has been found to be particularly true when shifting into low gear. The present apparatus is so instantaneously responsive to operation of the lever 119 that seizing of the gears sometimes occurs.

This condition is aggravated by the fact that the extreme viscosity of the transmission lubricant and the "setting" thereof when the motor is cold require the provision of a shifting motor of far greater power capacity than is required during most of the conditions in which gear shifting is accomplished. The maximum degree of viscosity of the transmission lubricant is present only when the motor vehicle has been setting for some time and the motor and transmission are cold, and the viscosity is very greatly reduced after only a few minutes driving, or after the vehicle engine has been running a few minutes with the clutch engaged to cause the spinning gears to agitate the lubricant. Accordingly the motor 40 provides far greater power than is necessary after the motor and consequently the transmission gears have become slightly warmed, or the viscosity of the transmission lubricant has been reduced by agitation, and the too rapid shifting of the gears causes the relatively highly powered motor 40 to shift gears too rapidly with the disadvantageous results referred to.

By way of illustration, tests with a given shifter installation indicated that with the transmission lubricant at 0° F., a vacuum in the shifting motor of 19 inches of mercury was required to move a shift rail, and with the particular shifter installation referred to, this represented a force of nearly 130 lb. exerted by the piston of the shifting motor. After several shifts at substantially the same lubricant temperature, a vacuum of 10 inches of mercury was required with the particular shifter installation being tested, representing a shifting motor piston force of only a little over 65 lb. Accordingly it will be apparent that only approximately 50 per cent. of the force was required after making a few shifts at the same lubricant temperature.

Substantially normal operating conditions are provided after a few shifts at the same temperature, or after the transmission lubricant has become warmed somewhat to reduce the viscosity of the transmission lubricant. It has been found that it would be advisable in practice, with the particular installation referred to, to maintain a maximum vacuum of approximately 10 inches of mercury in the shifting motor for shifting under normal conditions. Any substantially greater vacuum has been found to occasionally result in seizing of the gears and in providing a noisy shifting operation. The lack of means for maintaining a limited degree of vacuum under normal operating conditions has been one of the highly disadvantageous features of prior transmission shifting mechanisms. The maximum desirable vacuum will vary in different shifter installations, of course, depending on shifting motor piston areas, etc. With reference to the performance of the shifting operations under normal transmission conditions, it is well known that some drivers make it a habit to substantially accelerate the speed of a vehicle engine prior to each shift. With the vehicle moving and the motor running at a relatively high speed, the releasing of the throttle for movement to its biased position results in the vacuum in the intake manifold sometimes rising as high as 25 inches of mercury or more, the vehicle engine acting as a pump under such conditions. It will be obvious that such a degree of vacuum is entirely too high for the proper shifting of gears under normal conditions with a shifting motor which is designed to provide the necessary power when maximum resistance to the shifting movement is offered by cold and "set" transmission lubricant.

It also has been found in practice that regardless of the simplicity of the mechanical connections provided between the lever 119 and the valve 50 it is extremely difficult to maintain a quiet operation of such connections. This also has been found to be due almost entirely to the extremely rapid response of the piston 40 to the follow-up valve mechanism, the piston tending to over-run its position under some conditions and tending to provide slack in the connections between the valve 50 and the lever 119. Accordingly it is highly desirable to provide a very slight lagging of the piston 42 with respect to the lever 119, under which conditions slack will be taken up in the mechanical connections referred to and thus render their operation almost completely noiseless.

The mechanisms shown in Figures 5 and 6, and 9 to 14 inclusive overcome the disadvantageous features of operation referred to in that either type of control device is effective in preventing too rapid or too forceful shifting of the gears. Moreover, either type of mechanism referred to functions to eliminate noise from the mechanical connections between the lever 119 and valve 50.

Referring to Figure 5, it will be noted that the spring 144 is preferably always loaded and the tension of the spring is adjustable by means of the nut which engages the cup 143. Assuming that the vehicle is started with the motor and transmission cold, the fluid in the Sylphon type thermostat will be relatively contracted and accordingly the cup member 141 will be moved to the right of the position shown in Figure 5, thus substantially increasing the loading of the spring 144, and moving the valve 146 further away from its seat. The loading of the spring under such conditions will definitely hold the valve 146 off its seat against the action of variable differential pressures on opposite sides of the valve and its diaphragm, which differential pressures will be referred to later. The degree of communication thus provided between the recesses 151 and 152 will be such that the operation will be the same as if the pipes 60 and 161 (Figure 1) were directly connected to each other, there being no restriction upon the flow of air from the pipe 60 to the pipe 161 beyond the degree of restriction normally inherent in these pipes.

Thus when the apparatus is operated in accordance with the foregoing description the shifting motor 40 functions solely in response to the operation of the valve mechanism 47, the maximum power of the shifting motor being available for each shifting operation. This is highly desirable under the conditions being considered inasmuch as the transmission lubricant will be highly viscous and will offer substantial resistance to the movement of the motor piston 42 for providing any desired gear ratio.

It has been found that by conduction of heat from the motor and by the generation of frictional heat in the lubricant 128, this lubricant becomes heated relatively rapidly after the starting of the motor, and accordingly there is a rapid decrease in the viscosity of the lubricant shortly after the motor is started, aside from the reduction in viscosity by agitation. As the temperature of the lubricant 128 increases, expansion of the thermostat fluid will occur, and this expansion moves the free end of the expansible diaphragm toward the left as viewed in Figure 5 to reduce the loading of the spring 144. Accordingly, as the temperature of the lubricant progressively increases, there will be a progressive decrease in the force of the spring 144 acting on the stem 142 to tend to hold the valve 146 off its seat.

The unloading of the spring occurs progressively until the fingers 139 engage the stops 163 at which time the cups 141 will be prevented from moving further to the left as viewed in Figure 5. Accordingly there can be no further unloading of the spring beyond such point and the tension of the spring 144 is adjusted so as to provide the desired tension when the fingers 139 contact with the stops 163 to thus determine the maximum differential pressure which can be generated in the shifting motor.

It will be apparent that when the normal conditions of the engine are established, therefore, the position of the valve 146 will be partly determined by the adjusted tension of the spring 144, and the position of the valve will be further determined by differential pressures on opposite sides of the diaphragm 147 acting in opposition to the spring 144. The pressure at the right side of the diaphragm as viewed in Figure 5 will be constant, namely, the pressure of the atmosphere, while the pressure on the opposite side of the diaphragm will be variable and will be determined by the speed of operation of the follow-up valve 50.

Movement of the valve 50 will connect one end of the shifting motor to the intake manifold through the chambers 151 and 154, and since differential pressures on opposite sides of the diaphragm 147 determine the position of the valve 146, it will be apparent that this valve functions as a pressure control valve to prevent the building up of excessive vacuums in the pipe line leading from the chamber 154 to the follow-up valve. While operation of the valve 50 is intended to permit the exhausting of air from one end of the shifting motor, the rate of exhaustion will depend upon the degree of vacuum between the shifting motor and the chamber 154, and the functioning of the device in Figure 5 prevents the development of too high a degree of vacuum in the chamber 154.

In other words, at any time during the operation of the shifting motor the valve 146 will be moved against its seat by air pressure acting on the right hand side of the diaphragm 147 if the pressure in the chamber 154 drops below the point predetermined by the adjustment of the spring 144. In this connection it will be noted that the area of the diaphragm 147 is very large compared to the area of the valve 146, thus rendering the diaphragm properly sensitive to changes in pressure in the chamber 154. If the valve 146 closes during operation of the motor, the building up of pressure in the chamber 154 incident to continued exhaustion of air from the motor cylinder will increase the pressure in the chamber 154, thus reducing the differential pressures affecting the diaphragm 147 and permitting the valve 146 to move off its seat and thus connect the chambers 151 and 154 to an extent governed by the distance of movement of the valve 146 away from its seat. Upon the reduction in pressure in the chamber 154 incident to the further exhaustion of air therefrom, it will be apparent that the valve 146 will then move toward its seat and will engage the seat when the pressure in the chamber 154 drops to the predetermined point. Thus it will be apparent that the differential pressures acting on the diaphragm 147 determine the maximum vacuum which can be established in the chamber 154, and accordingly the maximum vacuum which can be connected to one end of the shifting motor. In practice it has been found that a partial vacuum of approximately ten inches of mercury in the chamber 154 is satisfactory for providing the proper maximum speed of operation of the shifting motor. This value, of course, is not a constant for all installations and the proper vacuum for normal operating conditions can be provided by adjusting the tension of the spring 144 and thus determine the differential pressures which will be required on opposite sides of the diaphragm 147 to seat the valve 146. Accordingly it will be apparent that the shifting motor is prevented under all conditions from transmitting excessive force to the shift rails for moving them. Thus a careless or unskilled operator is prevented from shifting gears too rapidly and thus causing the seizing of the gears.

The functioning of the device in the manner stated also causes the movement of the valve 50 to lag slightly behind the movement of the manual lever 119, although this lagging is not sufficient in actual practice to be noticeable to the operator or to retard the speed of the shifting operation, unless the operator attempts to shift gears too rapidly. The function of causing the valve 50 to lag behind the lever 119, however, is highly desirable in that it tends to take up all play in the mechanical connections between the valve 50 and the lever 119, thus rendering such connections almost entirely noiseless in operation. As a matter of fact the present invention, for test purposes, has been deliberately applied to particularly noisy mechanisms with the result that noise in the motion transmitting elements referred to has been substantially completely eliminated.

The operation of the form of the invention shown in Figure 9 is identical with that shown in Figure 5 and need not be referred to in detail. The device shown in Figure 5 because of the use of the flexible tube 131, permits the casing 134 and elements carried thereby to be arranged at any desired point. The device shown in Figure 9 is slightly simpler but possesses a disadvantage in that it is fixed with respect to the transmission casing and projects a substantial distance therefrom. Some motor vehicle constructions are such that there is insufficient space adjacent the transmission casing to permit the use of such device, and this is particularly true in installations where it is necessary to mount some other part of the apparatus such as the valve mechanism 47 adjacent the side of the tranmission. However, it will be apparent that the particular mounting of the thermostatic control device and the particular form of such device are relatively unimportant. As a matter of fact, it is not essential that the form of thermostat employed include a bulb projecting into the transmission since it is fully practicable to render the apparatus responsive to temperature changes of the transmission housing externally thereof.

The form of the device shown in Figures 11, 12 and 13 provides substantially the same results as in the forms previously described, and has been found to be especially effective in actual operation. One of the principal advantages of such form of the invention lies in the fact that it does not depend for its operation on the heating of the transmission lubricant but merely delays the controlling of the shifting motor a sufficient length of time to permit the breaking up of the transmission lubricant either by the spinning of the gears in neutral with the clutch in engagement or by the accomplishment of the same result by the making of several shifts.

Referring to Figure 12, it will be noted that the passage 177 will be suitably connected to the follow-up valve mechanism while the passage 179 will be connected to the intake manifold. Assuming that the vehicle is at a standstill with the engine idling, preparatory to making a shift, the follow-up valve mechanism will be arranged in neutral position. Assuming also that the transmission lubricant is cold and relatively highly viscous and that the vehicle engine has just been started, the thermostat 192 will occupy the solid line position shown in Figure 12, in which case the valve 191 will be in the position shown. Accordingly the atmospheric port 198 will be closed and the space around the valve shank 194 will connect the passages 196 and 197, thus balancing pressures on opposite sides of the diaphragm 184.

Under such conditions the spring 187, which is loaded to a predetermined extent by adjusting the screw 189, will be free to exert its full force against the valve 186 to move it to a maximum extent away from its seat 182. Accordingly there will be substantially unrestricted communication between the passages 177 and 179, and accordingly the operator, by moving the follow-up valve mechanism, may build up the maximum differential pressure in the shifting motor. Accordingly ample power will be provided for shifting under the conditions in which maximum resistance is offered to the shifting movements.

The thermostat 192 is heated by the radiation of heat from the pad 203 which forms a part of the exhaust pipe, and it requires relatively few minutes for sufficient heat to be generated in the exhaust manifold to extend the thermostat and move it to its dotted line position. When the thermostat moves to such position, it will shift the valve 191 to its normal position in which the cylindrical portion of the valve above the shank 194 will disconnect the passage 197 from the passage 196. At the same time, the space around the shank 194 will connect the passage 196 and port 198, thus connecting the diaphragm chamber 195 to the atmosphere. At the same time, the diaphragm chamber 176, being disconnected from the chamber 195, will always have a pressure therein corresponding to the pressure in the passage 177.

Accordingly when the normal operation of the mechanism is established, differential pressures will exist on opposite sides of the diaphragm 184, the higher pressure being present in the chamber 195 since such chamber communicates with the atmosphere. The differential pressures affecting the diaphragm 184, therefore, tend to overcome the tension of the spring 187 to move the valve 186 toward its seat.

Since the pressure in the chamber 195 is constant, the differential pressures affecting the diaphragm 184 will be directly dependent upon the pressure in the diaphragm chamber 176. As previously stated, the spring 187 is loaded to a predetermined extent by adjusting the screw 189, and accordingly any predetermined differential pressure affecting the diaphragm 184 can be employed for closing the valve 186. In practice it has been found that a vacuum of approximately 10 inches of mercury in the passage 177 provides a highly effective operation. Assuming that the spring 187 is adjusted for such a degree of vacuum in the passage 177, it will be apparent that if the valve 186 is arranged a slight distance from its seat 182 to exhaust air from the passage 177 and the pressure in such passage drops below the predetermined degree of vacuum referred to, the differential pressure thus provided on opposite sides of the diaphragm 184 will seat the valve 186 and thus disconnect the passage 177 from the source of vacuum.

Thus it will be apparent that the mechanism, after normal operating conditions have been established, functions to prevent too high a vacuum from being established in the passage 187, and accordingly the differential pressures which can be built up in the shifting motor will be limited to a predetermined vacuum. Thus it will be impossible for an operator to shift too rapidly by moving the lever 119 at too high a rate of speed. The valve mechanism functions to limit differential pressures in the shifting motor and thus limit the maximum speed of the shifting operation, and the speed of movement of the floating lever 88 by the shifting motor also will be limited. This fact, however, does not provide a noticeable drag against the operation of the manual lever 119 unless the operator tends to make a shift too rapidly.

It will be noted that in the form of the invention shown in Figures 11 and 12 there is no progressive loading and unloading of the biasing spring 187 in accordance with varying temperature conditions as is true of the forms of the invention previously described. In actual practice such variation in the spring loading is unnecessary, and accordingly the two-condition operation of the mechanism in Figure 12 has been found to be highly efficient. Such mechanism operates in a simple manner to provide differential pressure in the shifting motor which is limited only by the degree of vacuum in the intake manifold when the motor is cold, and it requires only a few minutes time to establish normal conditions in which the resistance offered by the transmission lubricant is very materially reduced from its maximum. At such time the thermostat 192 functions to move the valve 191 downwardly to its normal position. While there is a progressive downward movement of this valve, such movement occurs in such a short space of time that the valve 191 could be considered as having only two operative positions.

Except for the manner of controlling the valve 191 the form of the invention shown in Figure 14 is identical in its operation with the form just described and need not be referred to in detail. Instead of providing thermostatic control means for the valve 191, this valve may be controlled in accordance with the operation of the carburetor choke valve. Assuming the device to be associated with an ordinary manual choke, it will be apparent that when the choke 211 is moved to the operative position shown in dotted lines in Figure 14, the bell crank lever 205 will be moved to the position shown in Figure 14, thus placing the valve 191 in a position corresponding to its position in Figure 12 when the motor is cold.

After the vehicle motor has warmed up, the choke will be returned to its normal position by moving the rod 209 to the left to rotate the crank 210 in a clockwise direction. This action moves the upper arm of the bell crank lever to the left as viewed in Figure 14 and the lower arm of the lever will move downwardly to transmit similar movement to the valve 191 and place it in its normal position. Accordingly normal operating conditions will be established shortly after the vehicle motor has been started. The form of the invention shown in Figure 14 is entirely practicable but is not preferred for the reason that a vehicle operator will occasionally forget to return a hand operated choke to normal position at the proper time. If the arm 210 is thermostatically operated the form of the invention shown in Figure 14 will be substantially as practicable as the form shown in Figure 12.

In view of the foregoing it will be apparent that the present apparatus is of general application in connection with power operated gear shifting mechanisms and that it is particularly advantageous for increasing the practical efficiency of the follow-up control valve mechanism illustrated. The apparatus controls the functioning of the parts to provide effective shifting regardless of the viscosity of the transmission lubricant and consequently the resistance offered by the lubricant to the shifting operations. The device effectively prevents seizing of the gears on their shafts due to careless or unskilled shifting, and the device has the further highly desirable characteristic of silencing the operation of the mechanical connections between the manual control lever and the control valve mechanism.

It is to be understood that the forms of the invention herewith shown and described are to be taken as preferred examples of the same and that various changes in the shape, size and arrangement of parts may be resorted to without departing from the spirit of the invention or the scope of the subjoined claims.

I claim:

1. In combination with a motor actuated shifting mechanism for changing the driving ratio of a transmission, means for controlling the maximum energization of said motor, and temperature responsive means for rendering said first named means inoperative.

2. In combination with a motor actuated shifting mechanism for changing the driving ratio of a transmission, means for controlling the maximum energization of said motor, means for adjusting said last named means independently of a shifting operation, and temperature responsive means for rendernig said first named means inoperative.

3. In combination with a motor actuated shifting mechanism for changing the driving ratio of a transmission, means for controlling energization of said motor throughout a shifting operation, adjustable means for controlling the amount of energy made available to said motor independently of a shifting operation whereby the force exerted by said motor can be adjusted for different operating conditions in said transmission, and temperature responsive means for rendering said last named means ineffective for substantially limiting energization of said motor.

4. In combination with a motor actuated shifting mechanism for changing the driving ratio of a transmission, adjustable means for predetermining the maximum amount of energy made available to said motor under all conditions whereby the maximum shifting force of said motor will not be excessive when conditions in the transmission offer minimum resistance to shifting operations, and temperature responsive means for determining the effectiveness of said last named means.

5. In combination with a transmission and a shifting mechanism for changing the driving ratio thereof, a differential fluid pressure motor connected to actuate said mechanism, means for limiting the differential fluid pressures to which said motor is subjected, and temperature responsive means for determining the effectiveness of said first named means.

6. In combination with a transmission and a shifting mechanism for changing the driving ratio thereof, a differential fluid pressure motor connected to actuate said mechanism, means for limiting the differential fluid pressures to which said motor is subjected, means for adjusting said last named means independently of a shifting operation, and temperature responsive means for determining the effectiveness of said first named means.

7. In combination with a transmission and a shifting mechanism for changing the driving ratio thereof, a differential fluid pressure motor connected to actuate said mechanism, valve mechanism for controlling the energization of said motor during shifting operations, adjustable means operable independently of said valve mechanism for controlling the differential pressures to which said motor will be subjected whereby the force exerted by said motor can be adjusted for different transmission operating conditions, and temperature responsive means for controlling the effectiveness of said adjustable means.

8. In combination with a motor actuated shifting mechanism for a shiftable transmission operating member, means for controlling the energization of said motor during shifting operations, a manual control member connected to operate said means, adjustable means independent of said first named means for limiting the energy made available to said motor to prevent the operator from applying excessive shifting force to the transmission for a particular operating condition thereof, and temperature responsive means for determining the effectiveness of said last named means.

9. In combination with a motor actuated shifting mechanism for a shiftable transmission operating member of a motor vehicle, means for controlling the energization of said motor during shifting operations, a manual control member connected to operate said means, adjustable means independent of said first named means for limiting the energy made available to said motor to prevent the operator from applying excessive shifting force to the transmission for a particular operating condition thereof, and means rendered operative during initial operation of the vehicle engine for rendering said last named means ineffective for limiting the energy made available to said motor.

10. In combination with a motor actuated shifting mechanism for a shiftable transmission operating member, a manual control member, means connected for operation by said member for controlling the energization of said motor during shifting operations and for supplying a resistance to manual movements of said control member which is substantially proportional to the resistance encountered by said shiftable member, independently adjustable means for limiting the energy made available to said motor to prevent the operator from applying excessive force to the transmission for a particular operating condition thereof, and means for rendering said last named means ineffective for substantially reducing the energy made available to said motor.

11. In combination with a motor actuated shifting mechanism for a shiftable transmission operating member, a manual control member, means connected for operation by said member for controlling the energization of said motor during shifting operations and for supplying a resistance to manual movements of said control member which is substantially proportional to the resistance encountered by said shiftable member, independently adjustable means for limiting the energy made available to said motor to prevent the operator from applying excessive force to the transmission for a particular operating condition thereof, and temperature responsive means for at least reducing the effectiveness of said last named means for limiting the energy made available to said motor.

12. In combination with a motor actuated shifting mechanism for a shiftable transmission operating member of a motor vehicle, a manual control member, means connected for operation by said member for controlling the energization of said motor during shifting operations and for supplying a resistance to manual movements of said control member which is substantially proportional to the resistance encountered by said shiftable member, independently adjustable means for limiting the energy made available to said motor to prevent the operator from applying excessive force to the transmission for a particular operating condition thereof, and means rendered inoperative after a period of initial operation of the vehicle engine and operative during such period for at least limiting the effectiveness of said last named means.

13. In combination with a motor actuated shifting mechanism for a shiftable transmission operating member, a manual control member, means connected for operation by said member for controlling the energization of said motor during shifting operations and for supplying a resistance to manual movements of said control member which is substantially proportional to the resistance encountered by said shiftable member, auxiliary control means movable to a position limiting the energy made available to said motor, means biasing said auxiliary control means away from such position, and temperature responsive means movable to provide a force acting in opposition to said biasing means for moving said auxiliary control means to said position.

14. In combination with a motor actuated shifting mechanism for a shiftable transmission operating member of a motor vehicle, a manual control member, means connected for operation by said member for controlling the energization of said motor during shifting operations and for supplying a resistance to manual movements of said control member which is substantially proportional to the resistance encountered by said shiftable member, auxiliary control means movable to a position limiting the energy made available to said motor, means biasing said auxiliary control means away from such position, and means rendered operative after a period of initial operation of the vehicle engine for providing a force opposing said biasing means to move said auxiliary control means to said position.

15. The combination with a shifting mechanism for a shiftable transmission operating member, a differential fluid pressure motor, a manual control member, valve mechanism, mechanical connections between said valve mechanism and said manual member and said motor to provide a follow-up action of the motor with respect to said manual member, adjustable means for predetermining maximum differential pressures in said motor independently of said valve mechanism to prevent the operator from applying excessive shifting force to the transmission for a particular operating condition thereof, and means operative under predetermined conditions for rendering said adjustable means ineffective for substantially limiting the application of differential pressures to said motor.

16. The combination with a shifting mechanism for a shiftable transmission operating member, a differential fluid pressure motor, a manual control member, valve mechanism, mechanical connections between said valve mechanism and said manual member and said motor to provide a follow-up action of the motor with respect to said manual member, adjustable means for predetermining maximum differential pressures in said motor independently of said valve mechanism to prevent the operator from applying excessive shifting force to the transmission for a particular operating condition thereof, and temperature responsive means for determining the effectiveness of said adjustable means for controlling the application of differential pressures to said motor.

17. The combination with a shifting mechanism for a shiftable transmission operating member of a motor vehicle, a differential fluid pressure motor, a manual control member, valve mechanism, mechanical connections between said valve mechanism and said manual member and said motor to provide a follow-up action of the motor with respect to said manual member, adjustable means for predetermining maximum differential pressures in said motor independently of said valve mechanism to prevent the operator from applying excessive shifting force to the transmission for a particular operating condition thereof, and means operative during a predetermined period of initial operation of the motor vehicle engine under predetermined conditions for rendering said adjustable means ineffective for substantially limiting the application of differential pressures to said motor.

18. In combination with a transmission having a shiftable transmission operating member, motor means connected to apply a force thereto to shift said member, a manually movable control member accessible to the operator and connected to control the energization of said motor means, means applying a smaller and substantially proportional force to said control member for opposing all movement thereof substantially simultaneously with the application of said first mentioned force so that the operator will feel a resistance to movement of the control member substantially proportional to the resistance encountered by said shiftable member, adjustable means independent of said control member for limiting the energy made available to said motor to prevent the operator from applying excessive shifting force to the transmission for a particular operating condition thereof, and means for rendering said adjustable means ineffective for substantially limiting the energy made available to said motor.

19. In combination with a transmission having a shiftable transmission operating member, motor means connected to apply a force thereto to shift said member, a manually movable control member accessible to the operator and connected to control the energization of said motor means, means applying a smaller and substantially proportional force to said control member for opposing all movement thereof substantially simultaneously with the application of said first mentioned force so that the operator will feel a resistance to movement of the control member substantially proportional to the resistance encountered by said shiftable member, adjustable means independent of said control member for limiting the energy made available to said motor to prevent the operator from applying excessive shifting force to the transmission for a particular operating condition thereof, and temperature responsive means for at least limiting the effectiveness of said adjustable means.

20. In combination with a motor vehicle transmission having a shiftable transmission operating member, motor means connected to apply a force thereto to shift said member, a manually movable control member accessible to the operator and connected to control the energization of said motor means, means applying a smaller and substantially proportional force to said control member for opposing all movement thereof substantially simultaneously with the application of said first mentioned force so that the operator will feel a resistance to movement of the control member substantially proportional to the resistance encountered by said shiftable member, adjustable means independent of said control member for limiting the energy made available to said motor to prevent the operator from applying excessive shifting force to the transmission for a particular operating condition thereof, and means operative during a predetermined period of initial operation of the vehicle engine for rendering said adjustable means ineffective for substantially limiting the energy made available to said motor.

21. In combination with a differential fluid pressure actuated shifting mechanism for a shiftable transmission operating member, a source of partial vacuum, control valve mechanism, a conduit connecting said source to said valve mechanism, means for operating said valve mechanism to control the connection of said motor to said source and to the atmosphere, a valve seat in said conduit, a valve associated with said seat, means biasing said valve away from said seat, differential pressure actuated means dependent upon the differential between atmospheric pressure and pressure in said conduit between said valve and said valve mechanism for moving said valve toward said seat against said biasing means, and temperature responsive means for rendering said differential pressure actuated means substantially ineffective for moving said valve against said biasing means.

22. In combination with a differential fluid pressure actuated shifting mechanism for a shiftable transmission operating member of a motor vehicle, a source of partial vacuum, control valve mechanism, a conduit connecting said source to said valve mechanism, means for operating said valve mechanism to control the connection of said motor to said source and to the atmosphere, a valve seat in said conduit, a valve associated with said seat, means biasing said valve away from said seat, differential pressure actuated means dependent upon the differential between atmospheric pressure and pressure in said conduit between said valve and said valve mechanism for moving said valve toward said seat against said biasing means, and means arranged to be operative during a period of initial operation of the vehicle engine for rendering said differential pressure actuated device substantially ineffective for moving said valve against said biasing means and for rendering said differential pressure actuated means operative after such period of operation of the vehicle engine.

23. In combination with a differential fluid pressure actuated shifting mechanism for a shiftable transmission operating member, a source of partial vacuum, control valve mechanism, a conduit connecting said source to said valve mechanism, means for operating said valve mechanism to control the connection of said motor to said source and to the atmosphere, a valve seat in said conduit, a valve associated with said seat, means biasing said valve away from said seat, a diaphragm connected to said valve and having opposite faces thereof respectively subject to atmospheric pressure and to the pressure in said conduit between said valve and said valve mechanism to normally urge said valve toward its seat against said biasing means, and means for balancing pressures on opposite sides of said diaphragm under predetermined conditions.

HENRY W. HEY.